(12) United States Patent
Lamberg et al.

(10) Patent No.: US 8,214,690 B2
(45) Date of Patent: Jul. 3, 2012

(54) METHOD FOR TESTING A CONTROL APPARATUS AND TEST DEVICE

(75) Inventors: Klaus Lamberg, Schwaney (DE); Christine Thiessen, Paderborn (DE); Matthias Schnelte, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 0 days.

(21) Appl. No.: 12/703,917

(22) Filed: Feb. 11, 2010

(65) Prior Publication Data

US 2010/0218046 A1 Aug. 26, 2010

(30) Foreign Application Priority Data

Feb. 20, 2009 (EP) ..................................... 09002479

(51) Int. Cl.
*G06F 11/00* (2006.01)
(52) U.S. Cl. ............................................ 714/28; 714/33
(58) Field of Classification Search .................... 714/28, 714/33
See application file for complete search history.

(56) References Cited

U.S. PATENT DOCUMENTS

| | | | |
|---|---|---|---|
| 6,415,396 B1* | 7/2002 | Singh et al. | 714/38.13 |
| 6,457,152 B1* | 9/2002 | Paley et al. | 714/738 |
| 6,804,634 B1* | 10/2004 | Holzmann et al. | 703/2 |
| 6,829,731 B1* | 12/2004 | LaFauci et al. | 714/33 |
| 6,871,298 B1* | 3/2005 | Cavanaugh et al. | 714/33 |
| 2007/0283188 A1* | 12/2007 | Balzer et al. | 714/26 |
| 2008/0109475 A1 | 5/2008 | Burmester et al. | |

OTHER PUBLICATIONS

EPO Search Report for EP09002479.5, dated Jul. 21, 2009 (with translation of Examiner's Notes).
Mahajan R., et al., "A Multi-Language Goal-Tree Based Functional Test Planning System", ITC International Test Conference, pp. 472-481.
Håkan L.S. Younes and Reid G. Simmons, "VHPOP: Versatile Heuristic Partial Order Planner", Journal of Artificial Intelligence Research 20: pp. 405-430, © 2003 AI Access Foundation.
Rolf Schwitter et al., "Attempto Controlled English (ACE) for Software Specifications", Department of Computer Science, University of Zurich, pp. 1-8.
K. Amschler Andrews et al., "AI Planner Assisted Test Generation, Anneliese Software Quality Journal", 10, pp. 225-259. © 2002 Kluwer Academic Publishers, Manufactured in The Netherlands.

(Continued)

*Primary Examiner* — Charles Ehne
(74) *Attorney, Agent, or Firm* — Orrick Herrington & Sutcliffe, LLP

(57) ABSTRACT

A method is described and represented for testing a control apparatus with a test device, where the control apparatus has at least one state variable and at least one actual functionality that contains a time dependency, and the control apparatus and the test device are connected to each other via a signal interface.

The problem of the present invention is to prevent—at least partially—the disadvantages known from the state of the art, and, particularly, to provide a method for testing a control apparatus, which allows as simple and flexible an acquisition of the target functionality of a control apparatus is possible, and which takes into account the time dependency of the target functionality as comprehensively as possible during the test case generation.

37 Claims, 7 Drawing Sheets

OTHER PUBLICATIONS

Michael Esser and Peter Struss, "Automated Test Generation from Models Based on Functional Software Specifications", To appear in: 3rd Indian International Conference on Artificial Intelligence (HCAI-07), Dec. 17-19, 2007, Pune, India, 14 pages—No. 1.

M. Esser and P. Struss, "Model-based Test Generation for Embedded Software", To appear in 2nd MONET Workshop on Model-Based Systems at IJCAI-05, Jul. 20, 2005, 7 pages—No. 2.

Michael Esser and Peter Struss, "Obtaining Models for Test Generation from Natural-language-like Functional Specifications", Model-Based Systems & Qualitative Reasoning Group of the Technical University of Munich, pp. 1-36—No. 3.

M.W. Esser and P. Struss, "Obtaining Models for Test Generation from Natural-language-like Functional Specifications", In: G. Biswas et al. (eds.) DX'07, 18th International Workshop on Principles of Diagnosis, May 29-31, 2007, Nashville (USA), pp. 75-82—No. 4.

P. Struss, "Model-based Optimization of Testing through Reduction of Stimuli", In: International Joint Conference on Artificial Intelligence (IJCAI), Jan. 6-12, 2007, Hyderabad, India; 6 pages—No. 5.

Atif M. Memon et al., "Hierarchical GUI Test Case Generation Using Automated Planning", IEEE Transactions on Software Engineering, vol. 27, No. 2, Feb. 2001, pp. 144-155.

Martin Sachenbacher and Stefan Schwoon, "Model-based Test Generation using Quantified CSPs", Technische Universität München, Institut für Informatik, Boltzmannstraβe 3, 85748 Garching, Germany, 6 pages.

Michael Scheetz et al., "Generating Test Cases from an OO Model with an AI Planning System", Computer Science Department, Colorado State University, Fort Collins, CO 80523, Downloaded on Nov. 11, 2008 at 06:39 from IEEE Ixplore, 10 pages.

Ghallab, M. and Traverso, P., "Automated Planning: Theory and Practice", Morgan Kaufmann, 2004, Chapter 14 Temporal Planning, pp. 309-347.

German Search Report dated Nov. 7, 2007 and English Translation thereof.

German Examiner's Report dated May 14, 2008 and English Translation thereof.

German Examiner's Report dated Oct. 29, 2008 and English Translation thereof.

Altova UModel—UML 2.1 Software Modeling and Application Development Tool; http://web.archive.org/web/20060904173222/http://www.altova.com/products/um; Jun. 29, 2007.

Agedis Consortioum; Agedis Model Based Test Generation Tools, Alan Hartman, Hartman@il.ibm.com, www.agedis.de.

Automated Test Generation Technology, Assertion Definition Language Project, X/Open Company Ltd.

From Natural Language Requirements to Executable Models of Software Components, Barrett R. Bryant, Beum-Seuk Lee, Fei Cao, Wei Zhao, Carol C. Burt, Jeffrey G. Gray, Rajeev R. Raje, Andrew M. Olson, and Auguston, Mikhail, Proceedings of the 2003 Monterey Workshop on Software Engineering for Embedded Systems, Sep. 24-26, 2003, Chicago, IL 2003, pp. 51-58.

Gebit Solutions, A.S. (planty@gebit.de); http://web.archive.org/web/20030618051817/http://www.gebit/de/download/planty/planty.html (with English language machine translation).

Mario Friske, Holger Pirk, Werkzeuggestützte interaktive Formalisierung textueller Anwendungsfallbeschreibungen für den Systemtest, Fraunhofer FIRST, Kekuléstraβe 7, D-12489 Berlin, {mario.friske, holger.pirk}@first.fhg.de (with English language machine translation).

Attempto Controlled English (ACE) for Software Specifications, Rolf Schwitter, Norbert E. Fuchs, Uta Schwertel, Department of Computer Science University of Zurich, {schwitter, fuchs, uschwert}@ifi-unizh.ch, http:/www.ifi.unizh.ch/~fuchs/, http://www.ifi.unizh.ch/~schwitter/.

ECOLE: A Look-ahead Editor for a Controlled Language; Rolf Schwitter, Anna Ljungberg, David Hood; Centre for Language Technology; Macquarie University, Sydney, NSW 2109, Australia, {schwitt|anna|dhood}@ics.mq.edu.au.

Attempto Controlled English (ACE) Language Manual, Version 3.0; Norbert E. Fuchs, Uta Schwertel, Rolf Schwitter, Institut für Informatik der Universität Zürich, Nr. 99.03—Aug. 1999.

Mario Friske and Holger Schlingloff. Von Use Cases zu Test Cases: Eine systematische Vorgehensweise. In T. Klein, B. Rumpe, and B. Schätz, editors, Tagungsband Dagstuhl-Workshop MBEES: Model Based Engineering of Embedded Systems, No. 2005-01 in Informatik-Bericht. TU Braunschweig, Jan. 2005 (with English machine translation).

Juergen Grossmann, Mirko Conrad, Ines Fey, Alexander Krupp, Klaus Lamberg, and Christian Wewetzer. TestML—A Test Exchange Language for Modelbased Testing of Embedded Software. In Proceedings of Automotive Software Workshop, Mar. 2006.

Matthias Grochtmann and Klaus Grimm. Classification Trees for Partition Testing. vol. 3 of Software Testing, Verification and Reliability, pp. 63-82. 1993.

Erich Gamma, Richard Helm, Ralph Johnson, and John Vlissides. Entwurfsmuster. Addison-Wesley, Jul. 2004, Section 1.2—pp. 4-6 and 163-173.

Robert Bosch GmbH. Kraftfahrtechnisches Taschenbuch. Springer Verlag, 1999, pp. 124 and 167 (with English machine translation).

Jens Grabowski. TTCN-3—A new Test Specification Language for BlackBox Testing of Distributed Systems. In Proceedings of the 17th International Conference and Exposition on Testing Computer Software (TCS'2000), Theme: Testing Technology vs.Testers' Requirements, Washington D.C., Jun. 2000.

Mou Hu. A New Test Design Method for Requirement-Based Software Testing. Beijing, China, Aug. 2000.

IEEE. IEEE Standard Glossary of Software Engineering Terminology, Dec. 1990.

British Computer Society Specialist Interest Group in Software Testing. Standard for software component testing (draft 3.4), Apr. 2001.

Erik Kamsties, Daniel M. Berry, and Barbara Paech. Detecting Ambiguities in Requirements Documents Using Inspections. In Mark Lawford and David L. Parnas, editors, Proceedings of the First Workshop on Inspection in Software Engineering (WISE'01), pp. 68-80, Paris, France, Jul. 2001. Software Quality Research Lab, McMaster University, Hamilton, Canada.

Stuart Kent. Model Driven Engineering. In M. Butler, L. Petre, and K. Sere, editors, Proceedings of the Third International Conference on Integrated Formal Methods (IFM 2002), vol. 2335 of Lecture Notes in Computer Science, p. 286-298, Turku, Finland, May 2002. Springer Verlag.

Klaus Lamberg. Software-Entwicklung: Software-Testen. In H. Wallentowitz and K. Reif, editors, Handbuch Kraftfahrzeugelektronik Grundlagen—Komponenten—Systeme—Anwendungen. Vieweg Verlag, Wiesbaden, 2006 (with English machine translation).

Peter Liggesmeyer. Software-Qualität. Spektrum Akademischer Verlag, 2002, Sections 1.3.2 and 13.1 (with English machine translation).

Donald W. Loveland. Automated theorem proving: A logical basis. In Fundamental studies in computer science, vol. 6, Amsterdam, New York, 1978. North-Holland Publishing Co.

Peter Liggesmeyer and Dieter Rombach. Software Engineering eingebetteter Systeme. Spektrum Verlag, 2005, Sections 7.1 and 15.1.1 (with English machine translation).

The OMG's Model Driven Architecture, Jan. 2002.

Bill Moore, David Dean, Anna Gerber, Gunnar Wagenknecht, and Philippe Vanderheyden. Eclipse Development using the Graphical Editing Framework and the Eclipse Modeling Framework. Jan. 2004.

Object Management Group. UML 2.0 Superstructure Specification, Aug. 2005. Document ptc/05-07-04.

Rainer Otterbach, Oliver Niggemann, and Joachim Stroop. SoftwareEntwicklung: Entwicklungsprozesse, Methoden und Werkzeuge. In H. Wallentowitz and K. Reif, editors, Handbuch Kraftfahrzeugelektronik Grundlagen—Komponenten—Systeme—Anwendungen. Vieweg Verlag, Wiesbaden, 2006 (with English machine translation).

Jan Peleska. Verbesserte Softwarequalität durch effiziente Testprozesse. Technologie-Zentrum Informatik und Verified Systems International GmbH. Revision: 1.5 (with English machine translation).

Amir Pnueli. The Temporal Logic of Programs. In Proceedings of the 18th IEEE Symposium on the Foundations of Computer Science, pp. 46-57. IEEE, 1977.

Chris Rupp. Requirements-Engineering und-Management. Hanser Verlag, 2004, Sections 7.1 and 8.2 (with English machine translation).

Rachel L. Smith, George S. Avrunin, and Lori A. Clarke. From Natural Language Requirements to Rigorous Property Specification. In Workshop on Software Engineering for Embedded Systems (SEES 2003): From Requirements to Implementation, pp. 40-46, Sep. 2003.

Uwe Schöning. Logik für Informatiker. Spektrum-Akademischer Verlag, Jan. 2000 (with English machine translation).

Georg E. Thaller. Software-Test: Verifikation and Validation. Verlag Heinz Heise, 2000, Sections 2.1 and 3.5 (with English machine translation).

Rupert Wiebel, Steffen Höh, and Stefan Hendrata. Specification Requirements Interchange Format (RIF), 2005.

Rajeev Alur, Costas Courcoubetis, and David L. Dill. Model-Checking in Dense Real-time. Information and Computation, 104(1):2-34, 1993.

Chris Aniszczyk. Using GEF with EMF. Eclipse Corner Articles, Jan. 2005.

Helmut Balzert. Lehrbuch der Softwaretechnik. Spektrum Akademischer Verlag, 1998, Sections 3.3, 2.2 and 5.1 (with English machine translation).

Bart Broekman and Edwin Notenboom. Testing Embedded Software. AddisonWesley, 2003, pp. 3-6 and 193-195.

Manfred Broy, Michael von der Beeck, and Ingolf Krüger. SOFTBED: Problemanalyse für das Großverbundprojekt "Systemtechnik Automobil—Software für eingebettete Systeme". In Ausarbeitung für das BMBF, 1998 (with English machine translation).

Edmund M. Clarke, E. Allen Emerson, and A. Prasad Sistla. Automatic Verification of Finite-State Concurrent Systems Using Temporal Logic Specifications. ACM Trans. Program. Lang. Syst., 8(2):244-263, 1986.

Edmund M. Clarke, Orna Grumberg, and Doron A. Peled. Model Checking. MIT Press, Cambridge, MA, 2000.

Chin-Liang Chang, Richard C. Lee, and Richard Char-Tung Lee. Symbolic Logic and Mechanical Theorem Proving. Academic Press, Inc., Orlando, FL, USA, 1997.

Thomas H. Cormen, Charles E. Leiserson, Ronald L. Rivest, and Clifford Stein. Introduction to Algorithms. The MIT Press, Sep. 2001—(Part 1—500 pages and Part 2—484 pages).

Mirko Conrad, Sadegh Sadeghipour, and Hans-Werner Wiesbrock. Automatic Evaluation of ECU Software Tests. In Proceedings of the SAE 2005 World Congress, p. 583, Detroit, USA, Apr. 2006. Software Quality Research Lab, McMaster University, Hamilton, Canada. SAE Techn. Paper No. 2005-01-1659.

Philippe Chevalley and Pascale Th'evenod-Fosse. Automated Generation of Statistical Test Cases from UML State Diagrams. compsac, 00:205, 2001.

Edsger W. Dijkstra. Notes on Structured Programming. Forschungsbericht EWD249, Apr. 1970.

E. Allen Emerson, Aloysius K. Mok, A. Prasad Sistla, and Jai Srinivasan. Quantitative Temporal Reasoning (Extended Abstract). In E. M. Clarke and R. P. Kurshan, editors, Computer-Aided Verification: Proc. of the 2nd International ConferenceCAV'90, pp. 136-145. Springer, Berlin, Heidelberg, 1991.

Stephan Flake, Wolfgang Müller, and Jürgen Ruf. Structured English for Model Checking specification. In GI-Workshop Methoden und Beschreibungssprachen zur Modellierung und Verifikation von Schaltungen und Systemen in Frankfurt, Berlin, 2000. VDE Verlag.

Mario Friske. Testfallerzeugung aus Use-Case-Beschreibungen. SoftwaretechnikTrends, 24(3), Aug. 2004. 21. Treffen der Fachgruppe 2.1.7 Test, Analyse und Verifikation von Software (TAV) der Gesellschaft für Informatik (GI) (with English machine translation)).

* cited by examiner

METHOD FOR TESTING A CONTROL APPARATUS AND TEST DEVICE

CROSS REFERENCE TO RELATED APPLICATIONS

The subject application claims priority to European patent application No. 09002479.5, filed Feb. 20, 2009.

FIELD OF THE INVENTION

The invention relates to a method for testing a control apparatus with a test device, where the control apparatus has at least one state variable and at least one functionality containing a time dependency, and the control apparatus and the test device are connected to each other via a signal interface. Furthermore, the invention also relates to a test device for carrying out the disclosed method on a control apparatus.

BACKGROUND AND SUMMARY OF THE INVENTION

Methods, for testing a control apparatus with a test device via a signal interface have been carried out in industrial practice since control apparatuses have been used and tested for their functionality.

A control apparatus denotes any computer-based apparatus or other technological equipment programmable with some functionality. Such a device could be embodied in hardware that is programmed once to perform a discrete function or a more general purpose device that can be re-programmed multiple times. The control apparatus is usually designed to be connected to a physical process where it acts on the process and/or monitors the process by receiving measurement data via a signal interface. The control apparatus can be embodied, for example, in a single board computer with appropriate I/O functionality, or it can be a more complex distributed computer system, or it can be embodied by other arrangements known or later developed in the art. The systems and methods disclosed herein are applicable to control apparatuses without regard to their actual hardware equipment and apparatus-technological design.

The number of functionality of control apparatuses, generally, can be immense—and are continuously increasing. For example, control apparatuses used in motor vehicles can easily comprise several hundred or even several thousand individual functionalities.

The performance of a functionality that is expected from the control apparatus—i.e., the target performance functionality—is often obtained, for example, from functional specifications and other specifications used in a particular application. A challenge arises in ensuring that the actual implemented operational performance of the control apparatus functionality corresponds with the desired and predetermined target performance functionality. In order to obtain the intended performance, target performance functionalities are analyzed, and translated into a signal level requirement. The signal level requirements represent the signals required for the control apparatus to be moved into a state that allows the generation of an expected reaction when certain conditions are present. Specifically, the reaction should be the one predetermined by the target functionality of the control apparatus, compliance with which can usually be observed according to the observed signal levels. Thus, the test of the control apparatus consists of the translation of the test cases into input signal patterns, the application of signal patterns by the test device to the control apparatus via the signal interface, and the acquisition of the pertinent state variables of the control apparatus by the test device. Then the comparison of the actual performance functionality and the target performance functionality naturally leads to the conclusion of interest indicating whether the control apparatus has the desired target functionality.

The analysis of the target functionality, the manual conversion of the target functionality into requirements, the additional manual conversion of the requirements in test cases—unequivocal test situations into which the control apparatus is put—and the translation of the test cases into signal patterns are extremely time consuming procedures that are susceptible to error. Thus, there is a general desire to automate these steps as much as possible when testing a control apparatus.

Different attempts are known in the art to automate methods for testing a technical device—but not actually a control apparatus—in particular, to acquire the target functionality and translate those targets into formal requirements and test cases, from which the actual test process then results.

A comparatively complicated method is known from the article "Obtaining Models for Test Generation from Natural-language-like Functional Specifications" by M. W. Esser and P. Struss (in G. Biswas et al. (eds), DX'07, 18th International Workshop on Principles of Diagnoses, May 29-31, 2007, Nashville, USA). This method relates to test case generation for testing software in the automotive sector. Here, requirements are obtained in formal language by a selection of gap texts that are suitable to take into account the typical requirement, usually using conditional constructions (e.g., if-then) and time dependencies through the acquisition of the duration of the states. The filled-out gap texts provide a formal representation of the target performance functionality, which describes the system (e.g., control apparatus) in the error-free case. Subsequently, error models are derived from the error-free model (e.g., ok model). This is done by observing the signal patterns that result from the intentional introduction of the error and comparing the behavior of the ok model from that of the error model. This, however, is comparatively complicated, because in addition to the ok model, an error model must also be generated for each error.

Another method for testing a technical system is disclosed in the article "AI-Planner Assisted Test Generation" by A. K. Amschler Andrews et al. (in Software Quality Journal, 10, 225-259, 2002, Kluwer Academic Publishers). In this article, the automatic test case generation for a data tape silo device is described, where the target functionality of the apparatus is acquired based on a model—namely by a state automaton—but time dependencies are not taken into account.

However, accounting for time dependencies can be essential for testing numerous control apparatuses because the implemented functionality often presents time dependencies, and the test of a control apparatus is incomplete, and therefore of low validity, if the time dependencies are not taken into account.

The present invention discloses exemplary embodiments that provide a method for testing a control apparatus that improves the acquisition of the target performance functionality of a control apparatus, while taking into account the time dependency of the target functionality during the test case generation.

One embodiment of the present invention discloses a method for testing a control apparatus with a test device, by carrying out the following process steps:

acquisition in formal language of at least one time dependency-containing target functionality as requirement, where the target functionality comprises at least one action and at least one expected reaction, generation of a requirement model from the requirements, generation of test cases by at least one achievability analysis carried out in the requirement model taking into account the time dependency of the target functionality, and translation of the test cases into signal patterns, application of the signal patterns by the test installation to the control apparatus via the signal interface, and acquisition of the pertinent state variables of the control apparatus with the test device.

One potential advantage to the disclosed methods for testing a control apparatus is that they allow the direct testing of the target functionality of a control apparatus, taking into consideration time dependencies of the target functionality, without an error model of the target functionality.

The use of formal language to acquire the time dependency-containing target functionality is semantically unequivocal, thus avoiding the lack of precision associated with common speech. This, however, does not mean that the formal language is not comprehensible in common language.

A target functionality typically comprises at least an action and at least one expected reaction. One example of an action can be the pressing of a button. The reaction of the target function that the action causes can be fixed. For example, the action of pressing a button might be that an alarm is activated at the latest after 100 ms. In this example, the "at the latest after 100 ms" is the required time dependency of the target functionality. While the functional scope of the control apparatus can naturally also include target functionalities that present no time dependency, the present invention can be employed when at least one target functionality of the control apparatus comprises a time dependency.

A requirement model that represents the totality of the requirements serves as the foundation for an achievability analysis. The problem of the achievability analysis is to find a sequence of actions through which the tested control apparatus can achieve a certain end state that is possible only if the control apparatus has the required target functionality. The achievability analysis can make use of all the actions that comprise the requirement model. It is particularly important here to take into account the existing time dependencies of the target functionality. Accordingly, a causal sequence of actions and reactions maintained and admissible time intervals for the actions and reactions are included in the achievability analysis.

According to a preferred embodiment of the method according to the invention, the time dependency of the target functionality consists of presetting a reaction time interval of the expected reaction, which accommodates the actual behavior of many technical systems. Thus, for example, a target functionality can be defined such that the reaction to an action is admissible and error free only if the reaction occurs only in a certain time interval after the triggering action.

For example, assume the target functionality of switching on a car alarm after the vehicle is locked (action), at least after a delay time $t_x$, but at no later than a delay time of $t_y$ after the triggering event. These conditions are close to actual practice because the response times of a control apparatus to a certain action can depend, for example, on the current state of the control apparatus, its failure, the priority of the action, or the priority of actions that occurred earlier in time. The response time can also depend on temporally nondeterministic components of the control apparatus, such as, for example, nondeterministic field buses.

In a most particularly preferred embodiment of the invention, the achievability analysis occurs with the allocation of at least one time boundary condition. Further, an additional time boundary condition ensures that the complete reaction time interval of the target functionality is taken into account. This occurs preferably by the presetting of the limit of a time inequality or by the presetting of this time inequality. This measure has the highly advantageous effect that test cases can be generated by the achievability analysis that take the reaction times into account, completely and without error.

The above-mentioned example of the locking of a vehicle (action) can illustrate this usage. In this example locking time can be called $t_{start}$. The reaction time interval is $[t_{start}+t_x; t_{start}+t_y]$ according to the above example. If, in the context of the achievability analysis, an additional time dependency is taken into account, which concerns the reaction time of this first event—activation of the alarm—conflicts can occur easily. Such a time dependency could consist, for example, of the requirement that the time of the activation of the car alarm—hereafter called $t_e$—follows after a defined, but not yet temporally fixed, time $t_z$. When this time $t_z$, which is defined, but temporally not yet concretely fixed, is in the reaction time interval $[t_{start}+t_x; t_{start}+t_y]$, this leads to a portion of the admissible reaction time interval $[t_{start}+t_x; t_{start}+t_y]$ no longer being taken into account. Therefore, one must ensure that this additional boundary condition $t_e > t_z$ is completed by an additional chronological order condition, for example, by the requirement that $t_z$ is elapsed before the start of the reaction time interval $[t_{start}+t_x; t_{start}+t_y]$, i.e., the time inequality $t_z < t_{start}+t_x$ holds.

It is advantageous to proceed, if needed, in such a way that the reaction time $t_e$ precedes a certain, but actually not yet fixed, time $t_z$, where here, to prevent time conflicts, the additional time boundary condition must be provided that the time $t_z$ must occur after the reaction time interval; consequently $t_z > t_{start} t_y$ holds.

The above-explained method for introducing additional time boundary conditions to take into account the complete reaction time interval is particularly advantageously usable if the method according to the invention generates a test case by achievability analysis in the formal requirement model, by first establishing, in a start plan, an initial state or an initial action (start), and an end state or an end action (end), in each case by the selection of at least one state variable with defined state, inserting, in the start plan, a requirement from the requirement model, between the initial state or the initial action (start), and the end state or the end action (end), so that a partial plan is created, and where the resulting causal coverage is acquired, particularly by causal connections, and by optionally inserting in the partial plan successive additional requirements from the requirement model, until, a solution plan, i.e., a causally gap-free path is achieved between the initial state (start) and the desired end state (end).

The acquisition of the requirement in formal language, which occurs at the beginning of the method, is preferably carried out by means of a controlled natural language.

This has the advantage that, in spite of the use of lexical, grammatical and semantic restrictions, the formulation of the requirements remains comprehensible in common language.

The problem is solved furthermore with a computer program with programming code means, for the purpose of carrying out the steps of the above-mentioned method. The program can be implemented in a data processing system, such a computer program with programming code means that are stored in a computer readable data carrier.

According to an additional teaching of the invention, the above-presented problem is also solved with a test device for testing a control apparatus by designing the test device in such a way that it allows the above-explained method to be carried out on the control apparatus.

In detail, numerous possibilities now exist to embody and further vary the method according to the invention and the test device according to the invention.

DETAILED DESCRIPTION

FIGS. 1-8 represent different aspects of a method for testing a control apparatus with a test device where the control apparatus has at least one state variable and at least one time dependency-containing actual functionality. The control apparatus and the test device are connected to each other via a signal interface. First, at least one time dependency containing target functionality is acquired—as a requirement—using a formal language. The target functionality comprises at least one action and at least one expected reaction. Then at least one requirement model is generated from the requirements. Test cases are subsequently generated by carrying out at least one achievability analysis on the requirement model, taking into account the time dependency of the target functionality. Finally, the test cases are translated into signal patterns, the signal patterns are applied by the test device to the control apparatus via the signal interface, and the state variables of interest of the control apparatus are acquired with the test device.

The target functionality of the control device can be listed, for example, in a table. Tables 1-3 provides an example target functionality:

TABLE 1

"Requirement 1"

| | |
|---|---|
| Precondition | — |
| Action | remote lock is pressed. |
| Postcondition | — |
| Reaction | alarm is set at the latest after 100 ms. |

TABLE 2

"Requirement 2"

| | |
|---|---|
| Precondition | alarm is set for less than 6 sec |
| Action | driver door is open. |
| Postcondition | — |
| Reaction | alarm is unset. |

TABLE 3

"Requirement 3"

| | |
|---|---|
| Precondition | alarm is set for more than 6 sec |
| Action | driver door is open. |
| Postcondition | — |
| Reaction | sounder is active. |

The requirements represented in the tables correspond to example requirements for target functionalities of a control apparatus in for use in a motor vehicle. They are merely exemplary requirements for the behavior of a control apparatus. The requirements in Tables 1-3 are represented in a controlled natural language. It is "controlled" because only selected semantic components of the natural language are allowed, so that the controlled language is semantically unequivocal. The representation in that sense is also a formal language acquisition of the target functionality.

Figure 1:
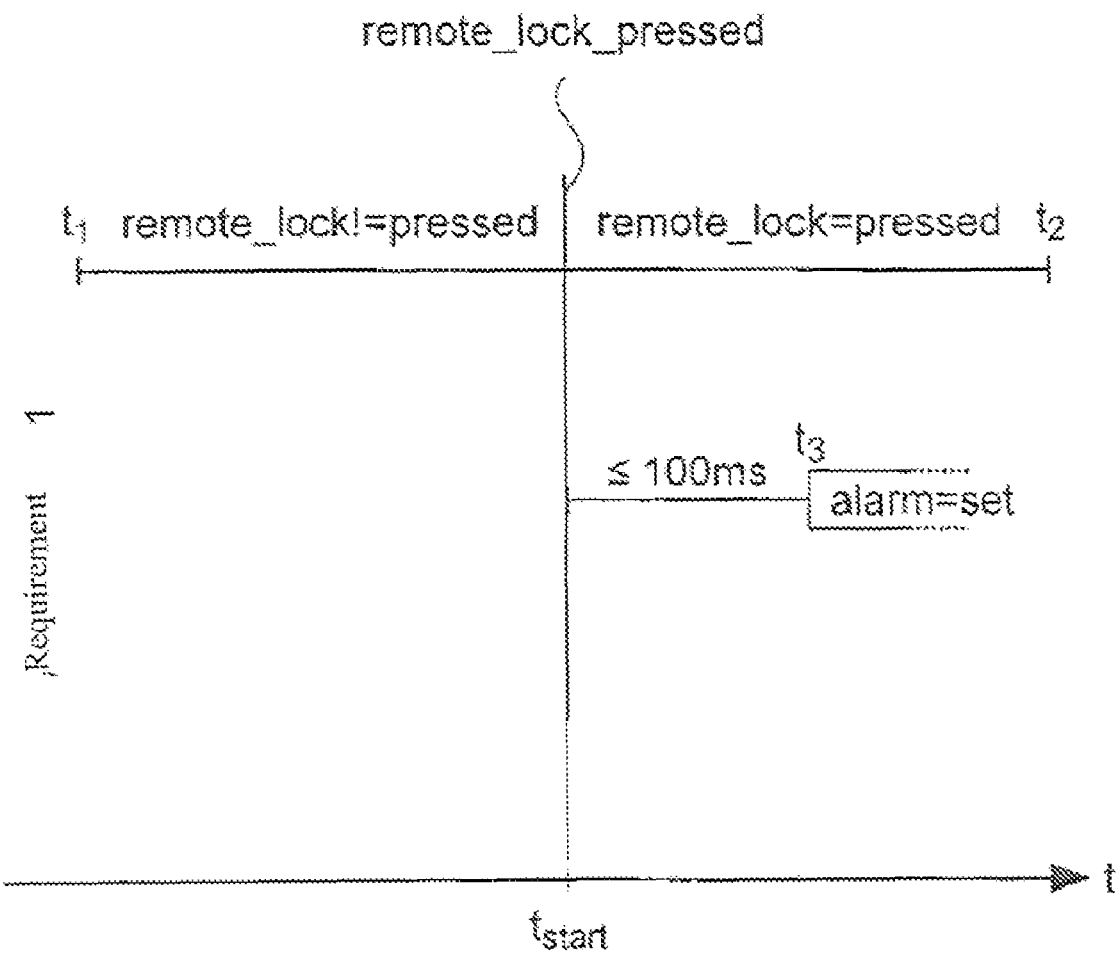
FIG. 1 shows a requirement without preconditions in a graphic representation.
Figure 2:
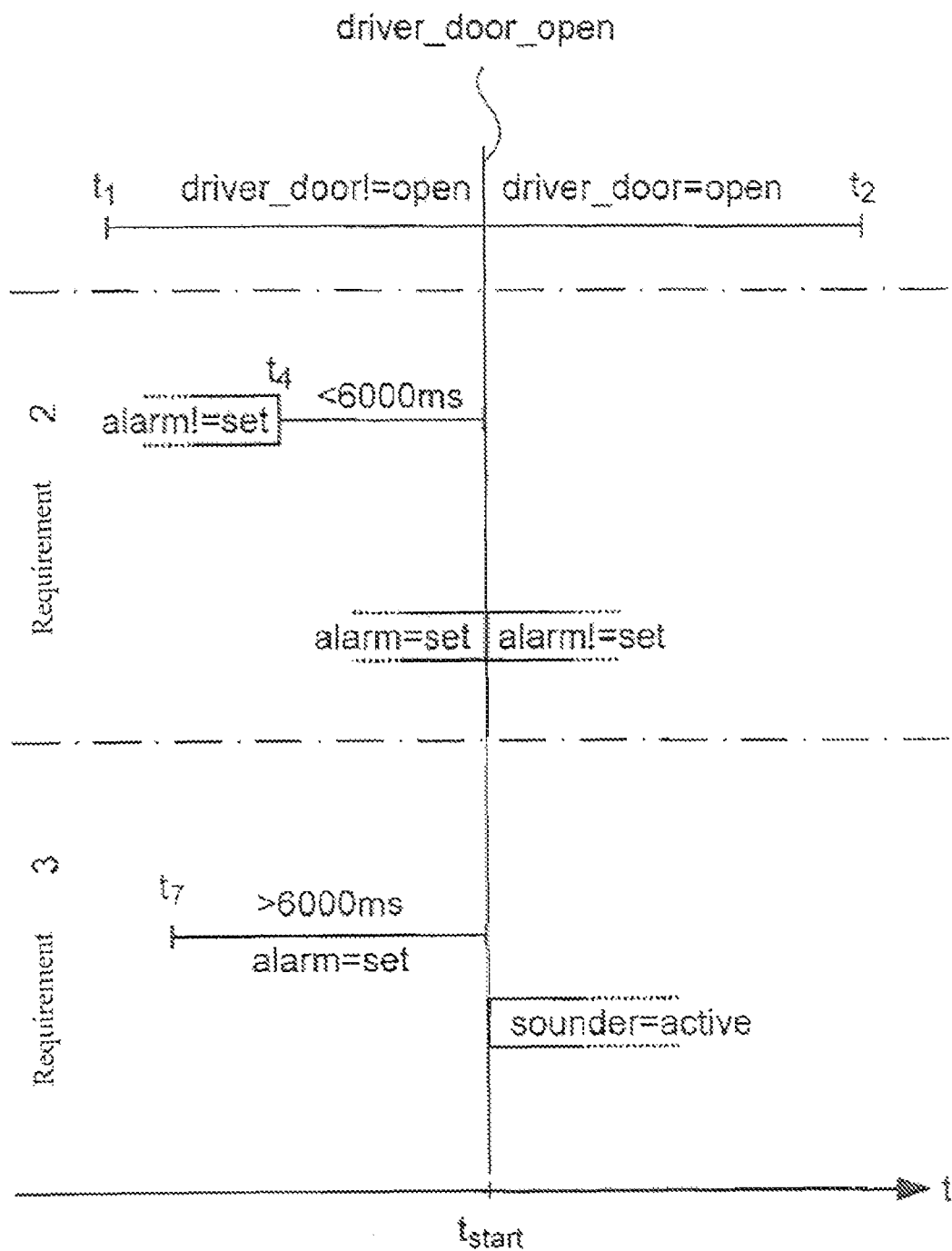
FIG. 2 shows two requirements with preconditions and time dependency in a graphic representation.

Requirement 1, which relates to the switching "on" of the car alarm, is free of any precondition. The time dependency is that, no more than 100 ms after the actuation of the remote controlled car lock (remote_lock), the vehicle alarm (alarm) is activated. In FIG. 1, this requirement is represented graphically by means of a time bar. At time $t_{start}$, the remote-controlled vehicle lock is actuated (action: remote_lock_pressed), after which the signal "alarm" is set to the value "set" within 100 ms. The signal "alarm" is then set permanently—as long as no action influencing the signal in another way occurs. In the figure this is indicated by the—dotted line—time interval that is open to the right.

Using two examples that also relate to the car alarm, in Tables 2 and 3, an actual-practice-relevant target functionality is described in each case, where the triggering of a reaction by an action is linked to a precondition.

Requirement 2 states that the alarm is deactivated when the driver door is opened, provided that the alarm was activated beforehand for less than six seconds.

Requirement 3 states that the alarm sounder "sounder" is activated, if the driver door is opened, provided that the alarm was activated beforehand for more than six seconds. This behavior is represented as an illustration in FIG. 2. Here the action "driver_door_open" is activated at time $t_{start}$, so that the signal "driver_door" changes from "!open" to "open." The exclamation mark used as prefix indicates that the corresponding signal has not been set. The acquisition in natural language of the target functionality is advantageously converted into a mathematical formal language representation, which contains additional components that allow a mathematical processing of the data, such as, for example, mathematical identifiers for the time interval limits to be taken into account. Converted into mathematical formal language, requirement 1 looks as follows, where it must be pointed out that this conversion from the controlled natural language representation to the mathematical formal language representation can be automated, and is also carried out automatically in the present case—namely with computer assistance:

remote_lock_pressed($t_{start}, t_5, t_1..t_4$)
    cond: remote_look@$[t_1, t_{start}]$: !pressed
    effect: remote_look@$[t_{start}, t_2]$: pressed
        when( )→alarm@$[t_3, t_4]$: set
    Constraints ($t_3 \geq t_{start}$) ∧ ($t_3 < t_{start} + 100$ ms)

Requirements 2 and 3 are formulated as follows in formal language:

```
driver_door_open(t_start, t_9, t_1 ...t_8)
    cond: driver_door@[t_1, t_start]: !open
    effect: driver_door@[t_start, t_2]: open
        when(alarm@[t_3, t_4]: !set ∧ (alarm@[t_5, t_start]: set)
            →alarm@[t_start, t_6]: unset
        when(alarm@[t_7, t_start]: set)
            → sounder@[t_start, t_8]: active
    Constraints: t_4 < t_start ∧ t_4 > (t_start − 6000 ms) ∧ t_7 < (t_start − 6000 ms)
```

"cond" here stands for a condition and after the word "Constraints" the time dependencies are indicated. "driver_door@[$t_1$, $t_{start}$]:!open" means that the signal "driver_door" has the value "!open" in the time interval [$t_1$, $t_{start}$], i.e., it is closed. The times $t_1$ to $t_9$ that occur in the formal language acquisition of the target functionality are functionally determined time intervals that are not yet assigned a concrete value. These have a certain dependency with respect to each other that is derived from the functional connection or obtained from the context of the achievability analysis.

Figure 3A:
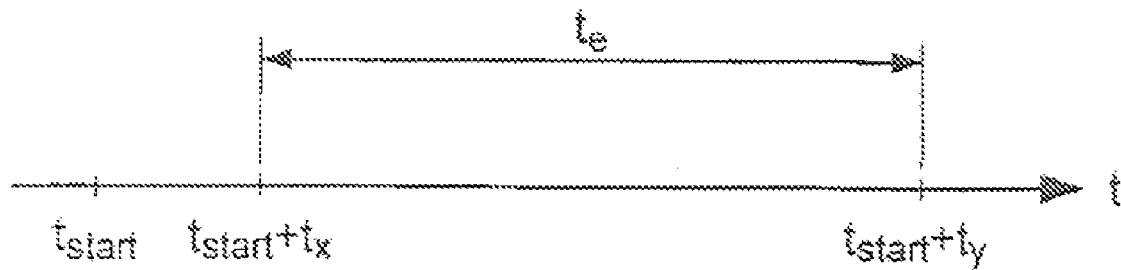
FIGS. 3a-3c show an embodiment example for the resolution of a conflict of time dependency by an additional time boundary condition.
Figure 3B:
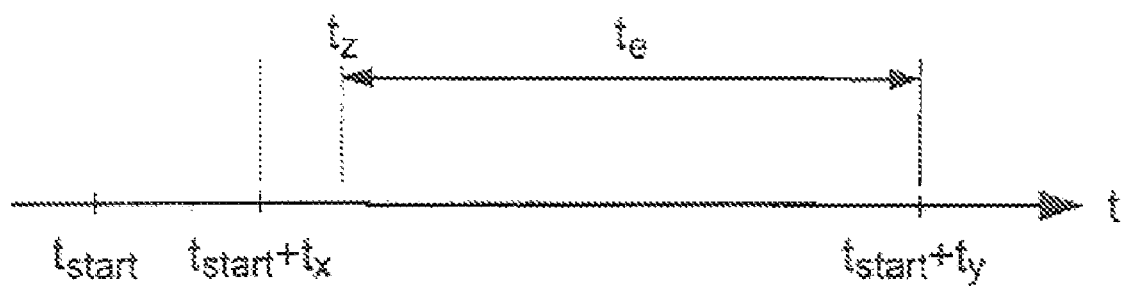
Figure 3C:
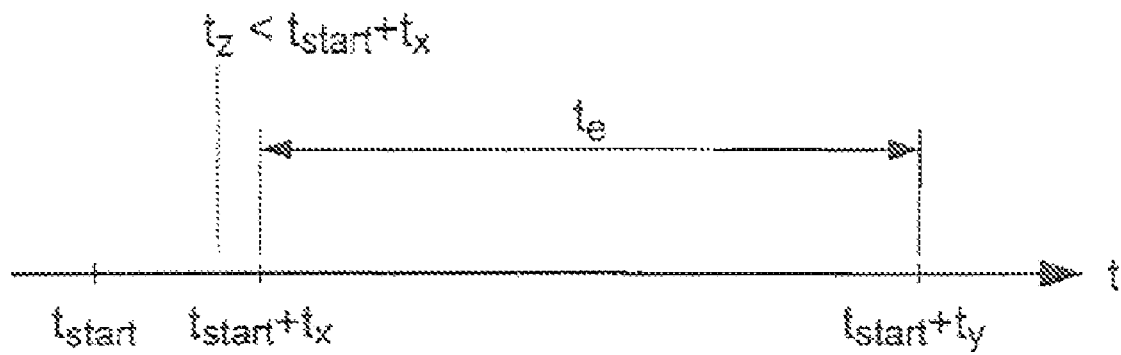

Requirement 1 is an example showing that the time dependency of the target functionality consists of presetting a reaction time interval of the expected reaction. In this case the reaction is that the signal "alarm" is set to the value "set." In the general case, such a reaction time interval does not have to follow immediately after the reaction triggering action. Rather, the reaction time interval can also occur with some separation from the time $t_{start}$ of the triggering action. This is represented in FIGS. 3 and 4 for example.

As already explained above, the problem in test case generation is that a test sequence—a succession of applied signal patterns—must be provided to the control apparatus to be tested, so that at least one specific action and the reaction triggered by it can be observed.

Figure 4A:
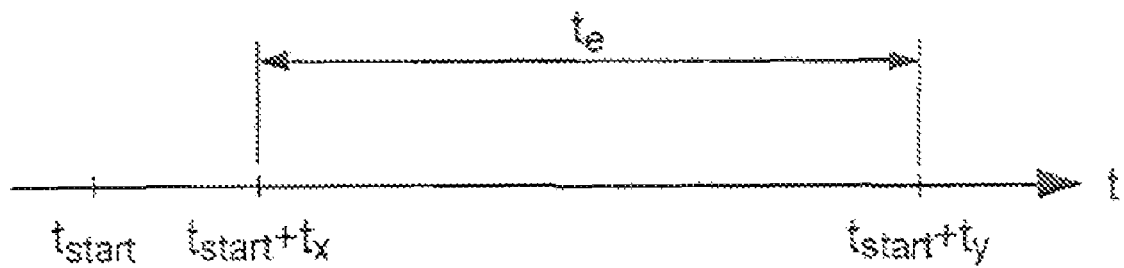
FIGS. 4a-4c show an additional embodiment for solving a time boundary condition conflict by the insertion of an additional time boundary condition.

When running through such a test sequence, it is now easily conceivable to link a certain event with several time dependencies. In FIGS. 3a and 4a, first the same—simple—time dependency is represented, namely a time dependency in the form of a reaction time interval. Following the triggering action at time $t_{start}$, the reaction at time $t_e$ can be triggered in the reaction time interval [$t_{start}+t_x$; $t_{start}+t_y$]. In FIG. 3b, an additional time dependency linked to $t_e$ is represented, namely the condition that $t_e$ occurs at a time that is later than the presetting time $t_z$. This has the result that, if $t_z$ is ranked in the time interval [$t_{start}+t_x$; $t_{start}+t_y$], a portion of the time interval—namely [$t_{start}+t_x$; $t_{start}+t_z$]—can no longer be taken completely into account. Such a conflict between two time dependencies linked with the occurrence of an event is solved by carrying out the achievability analysis by the allocation of at least one additional time boundary condition, so that the additional time boundary condition ensures that the entire reaction time interval is taken into account. In the embodiment example according to FIG. 3, this means that the additional condition $t_z < t_{start}+t_x$ is inserted, which again allows the possibility of the occurrence of the reaction event at all times $t_e$ in the time interval [$t_{start}+t_x$; $t_{start}+t_y$].

Figure 4B:
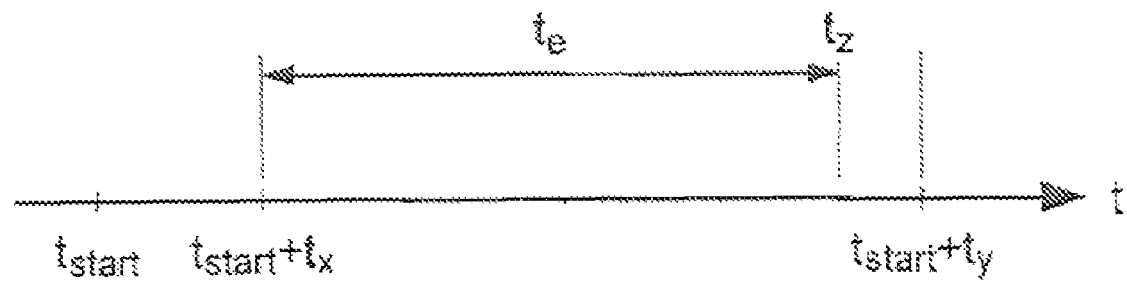
Figure 4C:
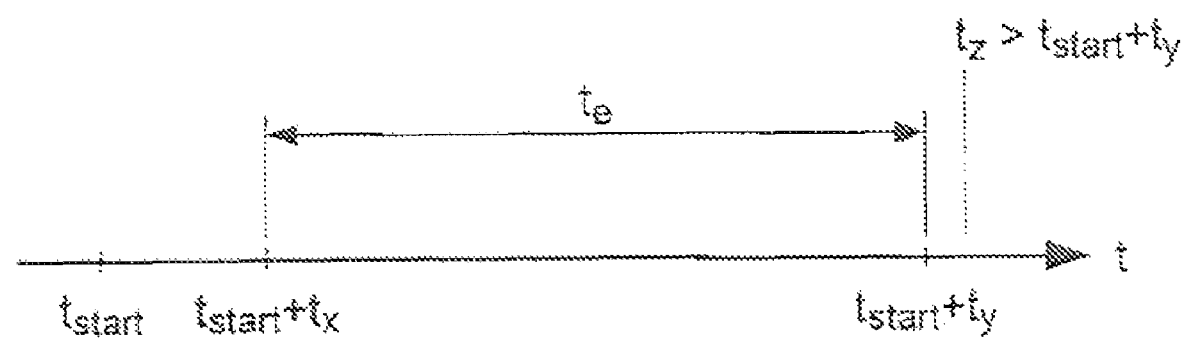
Figure 5:
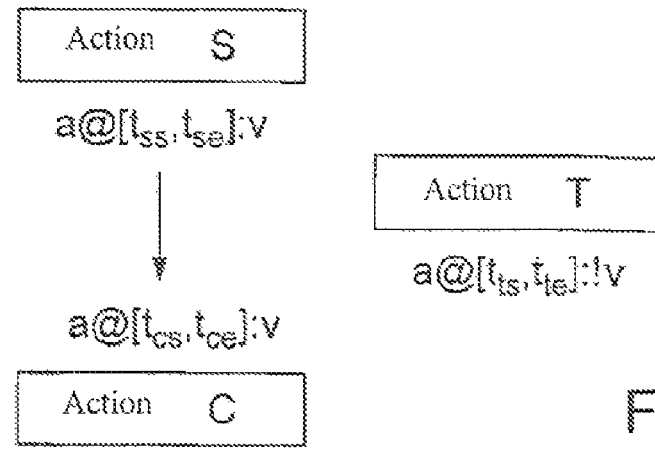
FIG. 5 shows an example of an unsuitable causal connection for the state conversion.

In FIG. 4, the corresponding case is represented, namely the case with the additional time dependency $t_e < t_z$, which is then problematic if $t_z$ occurs before the time $t_{start}+t_y$. This conflict can be eliminated by the additional time boundary condition that $t_z$ is greater than ($t_{start}+t_y$).

Figure 6:
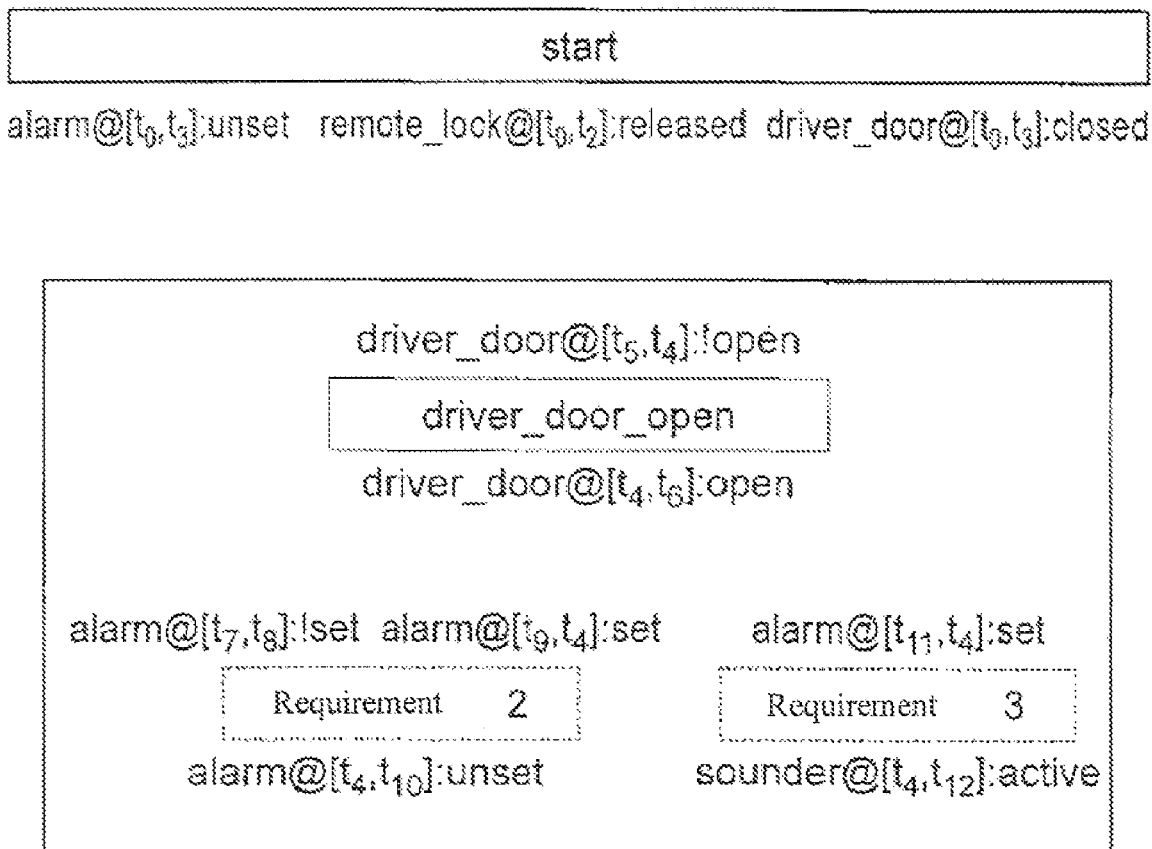
FIG. 6 shows an embodiment example for a start plan as the foundation of an achievability analysis.
Figure 7:
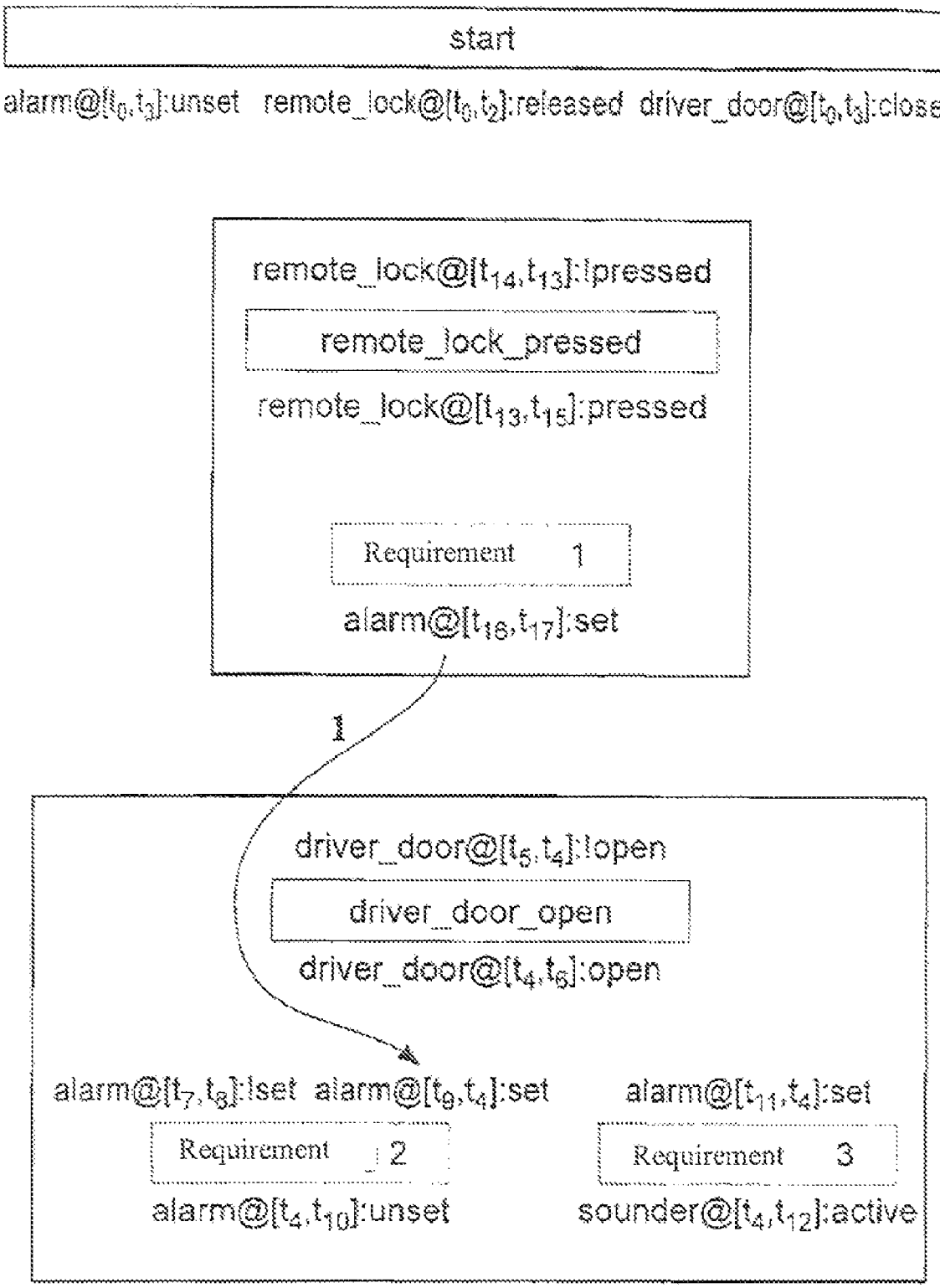
FIG. 7 shows the start plan from FIG. 6, expanded by a causal connection for the state conversion.
Figure 8:
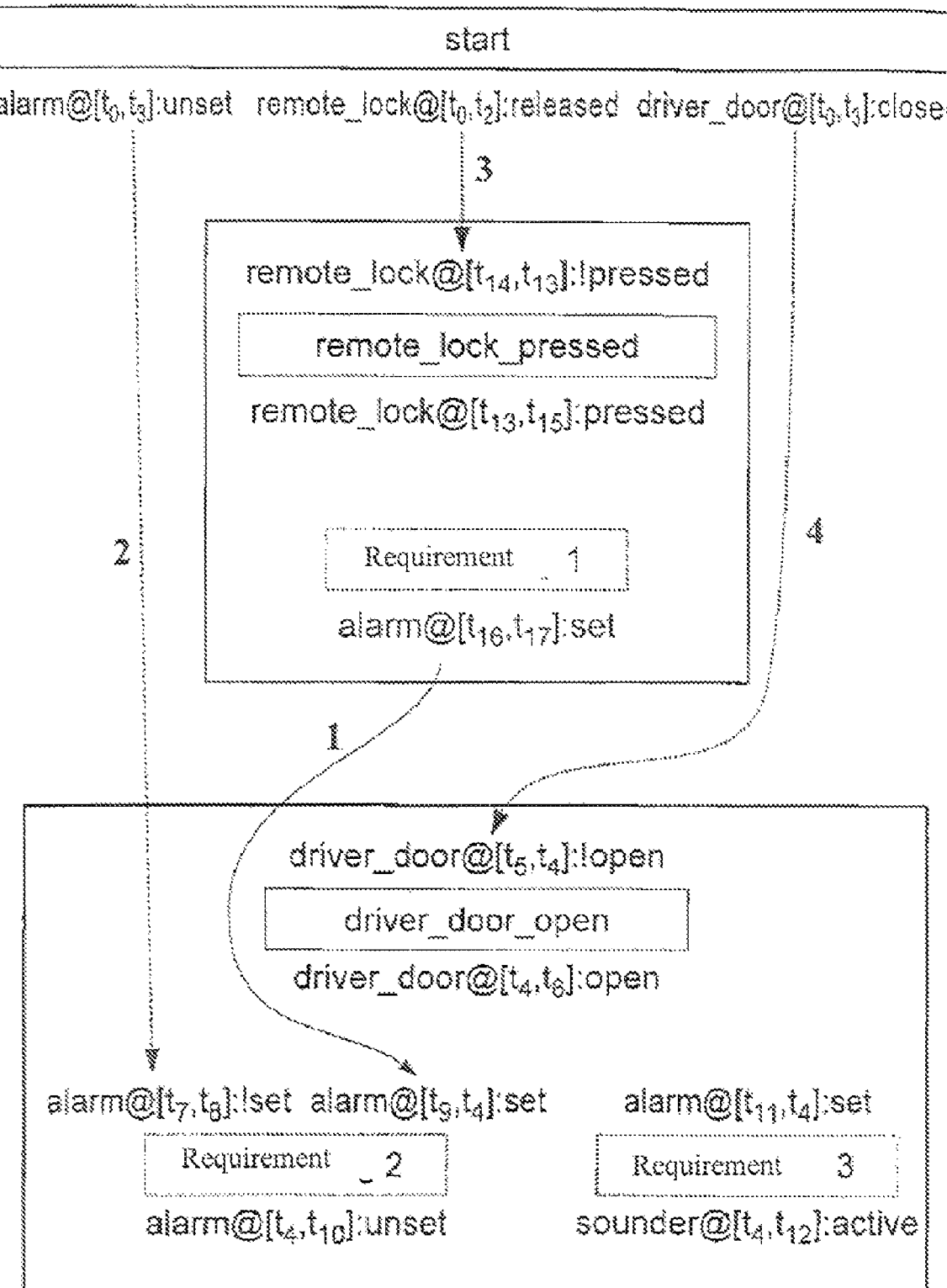
FIG. 8 shows the start plan from FIGS. 6 and 7 after a successful achievability analysis.

FIGS. 5-8 are an overall representation of a preferred implementation of the achievability analysis. In FIGS. 6, 7 and 8, the achievability analysis is represented with the help of requirements 1-3 that have been presented before. FIG. 6 shows a start plan of the achievability analysis with an initial state or an initial action "start" and an end state or an end action "driver_door_open," which can lead either to requirement 2 or to requirement 3, depending on what value the signal "alarm" has.

In the example represented in FIG. 6, the initial action only results in a certain initial state of the system in which the signal "alarm" is not set, the remote-controlled lock is not actuated, and the driver door is closed. The purpose of the achievability analysis is, in the example represented here, to satisfy the conditions of requirement 2, so that a positive test case is generated for the requirement 2. To be able to satisfy the requirement 2 that is derived from the initial state, all three conditions have to be satisfied—in the correct causal and temporal sequence—namely, on the one hand, "driver_door@[$t_5$, $t_4$]:!open" and, on the other hand, "alarm@[$t_7$, $t_8$]:!set", as well as "alarm@[$t_9$, $t_4$]:set"

In the next step of the achievability analysis, a requirement from the requirement model is inserted in the start plan.—The requirement model is the totality of all the known requirements—The requirement is inserted between the initial state or the initial action "start" and the end state or the end action "end" or "driver_door_open." This produces a partial plan where the causal coverage so achieved is acquired. In the embodiment example according to FIG. 7, the causal coverage is noted by the causal connection 1. This means only that the satisfaction of requirement 1 sets the signal "alarm", where the set signal "alarm" in turn is a prerequisite which is required to be able to satisfy requirement 2. In addition, there is another, namely temporal, boundary condition. The prerequisite "alarm@[$t_9$, $t_4$]:set" can naturally be influenced by the reaction "alarm@[$t_{16}$, $t_{17}$]:set" only if the interval [$t_9$, $t_4$] is within the interval [$t_{16}$, $t_{17}$], and, consequently, the following hold: $t_{16} \leq t_9$ and $t_{17} \geq t_4$. To this extent, the action "remote_lock_pressed" or the requirement 1 that is connected with it supports requirement 2. Purely in principle, all open conditions and corresponding supported actions must be found and associated with each other, and the corresponding time boundary conditions must be formulated.

In FIG. 8, additional causal—i.e., supporting—connections 2, 3, 4 are reported, which show which reaction to an action supports which precondition of another action. Thus the reaction "alarm@[$t_0$,$t_3$]:unset" of the action "start" can support the precondition "alarm@[$t_7$, $t_8$]:!set" (see causal connection 2), and, moreover, the result "remote_lock@[$t_0$, $t_2$]:released" of the action "start" can support the precondition "remote_lock@[$t_{14}$; $t_{13}$]:!pressed" of the action "remote_lock_pressed," (see causal connection 3), and, finally, the result "driver_door@[$t_0$, $t_3$]:closed" of the "start" action can support the precondition "driver_door@[$t_5$, $t_4$]:!open" of the action "driver_door_open" (see causal connection 4).

In the example according to FIGS. 6, 7 and 8, the causal coverage is complete due to the insertion of the action "remote_lock_pressed." In case no complete causal coverage could be achieved, successive additional requirements from the requirement model are inserted in the incomplete partial plan, until, as a solution plan, a causal, gap-free path is achieved between the initial state "start" and the desired end state "end", e.g., "alarm@[t4, t10]:unset", or the end action. Due to the successive insertion of requirements, the provision is made here that the requirements are largely atomized, and the requirement model is based on the composition of atomized requirements. As a result, the achievability analysis can be carried out in very small steps and with precise goals. This avoids using unnecessary components that are not needed to reach the goal, particularly unneeded reactions and preconditions, which, in the end, merely bloat the found test cases unnecessarily.

The causal connections 1, 2, 3, 4 only show the possible causal action connections. However, so far they do not take into account the temporal dependencies that have to be satisfied advantageously as well. Accordingly, the represented process provides for solving a causal inconsistency between requirements in the partial plan by setting at least one time boundary condition, where, as solution strategies, demotion and/or promotion of a reaction that has been recognized as interfering or of an action that triggers this reaction is/are available. An additional method to prevent or eliminate a causal inconsistency between requirements in the partial plan or in the solution plan consists of the confrontation, namely the avoidance of the start state or the precondition, that is the prerequisite for the inconsistency.

In the solution plan according to FIG. 8, one can see that a possible causal inconsistency exists between the causal connection 1 and the reaction "alarm@$[t_0, t_3]$:unset" of the "start" action because the resetting of the alarm destroys the causal connection 1. Since this reaction is unconditional, the inconsistency can be eliminated either by demotion—temporal resetting—or promotion—temporal presetting—of the reaction.

In this case, promotion, i.e., the temporal shift behind the causal connection 1 of the interfering reaction, can lead to an inconsistent time boundary condition, because it must be assumed that $t_4 < t_0$, although all times different from $t_0$ must necessarily be greater than $t_0$, because the entire plan of the achievability analysis only starts at all at time $t_0$. For this reason, to solve this conflict, only a demotion is suitable, namely by the insertion of the ordering time boundary conditions $t_3 \leq t_{16}$ and $t_3 < t_9$. This means that the causal connection 1 overwrites the effect of the causal connection 2 in any case, because the time interval $[t_0, t_3]$ is provided both by the time interval $[t_{16}, t_{17}]$ and also before the time interval $[t_9, t_4]$.

Since $t_{16}$ is the start time of a reaction, an additional, more stringent, boundary condition must be satisfied, namely $t_3 \leq t_{13}$.

The result of the additional time boundary conditions leads to a system of time boundary conditions that orders the start times of the different actions with respect to each other. The solution here is that the action "remote_lock_pressed" must be carried out before the action "driver_door_open," and "driver_door_open" must be carried out in less than 6000 ms, after the signal "alarm" has been set.

The above-described method is implemented as far as software is concerned, and fully automatically, according to the invention, in a test device that is not represented in greater detail here.

The invention claimed is:

1. A method for testing a control apparatus with a test device, where the control apparatus has at least one state variable and at least one actual functionality that contains a time dependency, and the control apparatus and the test device are connected to each other via a signal interface, which method comprises the following process steps:
   acquisition in formal language of at least one time dependency-containing target functionality as a requirement, where the target functionality comprises at least one action and at least one expected reaction without an error model of the target functionality,
   generation of a requirement model from the requirement,
   generation of one or more test cases by performing at least one achievability analysis carried out in the requirement model taking into account the time dependency of the target functionality, and
   translation of the test cases into signal patterns, application of the signal patterns by the test device to the control apparatus via the signal interface, and acquisition of the pertinent state variables of the control apparatus with the test device.

2. The method according to claim 1, wherein the time dependency of the target functionality comprises the presetting of a reaction time interval of the expected reaction.

3. The method according to claim 2, wherein the achievability analysis is carried out by the allocation at least one additional time boundary condition, where the additional time boundary conditions ensures that the entire reaction time interval is taken into account, by allocating the limit of a time inequality.

4. The method according to claim 1 wherein the target functionality and thus the requirement comprise at least one precondition or at least one postcondition.

5. The method according to claim 1 wherein the test case is generated by the achievability analysis in the formal requirement model, by
   a) first establishing a start plan comprising an initial state or an initial action, and an end state or an end action, in each case by the selection of at least one state variable with defined state,
   b) inserting, in the start plan, a requirement from the requirement model, between the initial state or the initial action, and the end state or the end action, so that a partial plan is created, and where the resulting causal coverage is acquired, including by causal connections, and
   c) inserting in the partial plan successive additional requirements from the requirement model, until a causally gap-free path is achieved between the initial state- and the desired end state.

6. The method according to claim 5, wherein a causal inconsistency between requirements in the partial plan or in the solution plan is resolved by setting at least one time boundary condition by demotion or promotion.

7. The method according to claim 5 wherein a causal inconsistency between requirements in the partial plan or in the solution plan is avoided by confrontation, by avoiding the start state that was the prerequisite for the inconsistency.

8. The method according to claim 1 wherein the requirements are atomized and the requirement model is based on a composition of atomized requirements.

9. The method according to claim 1 wherein the acquisition of the requirements in formal language occurs by a controlled natural language.

10. The method according to claim 1 wherein the requirements with the smallest number of necessary actions are selected from several requirements that were determined for testing a target functionality.

11. The method according to claim 1 wherein the target functionality and thus the requirement comprise at least one precondition and at least one postcondition.

12. A non-transitory computer readable data medium storing computer code for testing a control apparatus with a test device, where the control apparatus has at least one state variable and at least one actual functionality that contains a time dependency, and the control apparatus and the test device are connected to each other via a signal interface, wherein the computer code performs the following process steps:
   acquisition in formal language of at least one time dependency-containing target functionality as a requirement, where the target functionality comprises at least one action and at least one expected reaction without an error model of the target functionality,
   generation of a requirement model from the requirement, generation of one or more test cases by performing at least one achievability analysis carried out in the requirement model taking into account the time dependency of the target functionality, and translation of the test cases into signal patterns, application of the signal patterns by the test device to the control apparatus via the signal interface, and acquisition of the pertinent state variables of the control apparatus with the test device.

13. The non-transitory computer readable data medium of claim 12, wherein the time dependency of the target functionality comprises the presetting of a reaction time interval of the expected reaction.

14. The non-transitory computer readable data medium of claim 13, wherein the achievability analysis is carried out by the allocation at least one additional time boundary condition, where the additional time boundary conditions ensures that the entire reaction time interval is taken into account, by allocating the limit of a time inequality.

15. The non-transitory computer readable data medium of claim 12, wherein the target functionality and thus the requirement comprise at least one precondition or at least one postcondition.

16. The non-transitory computer readable data medium of claim 12, wherein the test case is generated by the achievability analysis in the formal requirement model, by a) first establishing a start plan comprising an initial state or an initial action, and an end state or an end action, in each case by the selection of at least one state variable with defined state, b) inserting, in the start plan, a requirement from the requirement model, between the initial state or the initial action, and the end state or the end action, so that a partial plan is created, and where the resulting causal coverage is acquired, including by causal connections, and c) inserting in the partial plan successive additional requirements from the requirement model, until a causally gap-free path is achieved between the initial state- and the desired end state.

17. The non-transitory computer readable data medium of claim 16, wherein a causal inconsistency between requirements in the partial plan or in the solution plan is resolved by setting at least one time boundary condition by demotion or promotion.

18. The non-transitory computer readable data medium of claim 12, wherein the target functionality and thus the requirement comprise at least one precondition and at least one postcondition.

19. The non-transitory computer readable data medium of claim 16, wherein a causal inconsistency between requirements in the partial plan or in the solution plan is avoided by confrontation, by avoiding the start state that was the prerequisite for the inconsistency.

20. The non transitory computer readable data medium of claim 12, wherein the requirements are atomized and the requirement model is based on a composition of atomized requirements.

21. The non-transitory computer readable data medium of claim 12, wherein the acquisition of the requirements in formal language occurs by a controlled natural language.

22. The non-transitory computer readable data medium of claim 12, wherein the requirements with the smallest number of necessary actions are selected from several requirements that were determined for testing a target functionality.

23. A test device for testing a control apparatus, where the control apparatus has state variables, and the test device can be connected with the control apparatus via a defined signal interface wherein the test device:

acquires a requirement in formal language at least one time dependency-containing target functionality, where the target functionality comprises at least one action and at least one expected reaction without an error model of the target functionality, generates a requirement model from the requirement, generates one or more test cases by performing at least one achievability analysis carried out in the requirement model taking into account the time dependency of the target functionality, and translates the test cases into signal patterns, applies the signal patterns of the test device to the control apparatus via the signal interface, and acquires the pertinent state variables of the control apparatus.

24. The test device of claim 23, wherein the time dependency of the target functionality comprises the presetting of a reaction time interval of the expected reaction.

25. The test device of claim 23, wherein the achievability analysis is carried out by the allocation at least one additional time boundary condition, where the additional time boundary conditions ensures that the entire reaction time interval is taken into account, by allocating the limit of a time inequality.

26. The test device of claim 23, wherein the target functionality and thus the requirement comprise at least one precondition or at least one postcondition.

27. The test device of claim 23, wherein the test case is generated by the achievability analysis in the formal requirement model, by a) first establishing a start plan comprising an initial state or an initial action, and an end state or an end action, in each case by the selection of at least one state variable with defined state, b) inserting, in the start plan, a requirement from the requirement model, between the initial state or the initial action, and the end state or the end action, so that a partial plan is created, and where the resulting causal coverage is acquired, including by causal connections, and c) inserting in the partial plan successive additional requirements from the requirement model, until a causally gap-free path is achieved between the initial state- and the desired end state.

28. The test device of claim 27, wherein a causal inconsistency between requirements in the partial plan or in the solution plan is resolved by setting at least one time boundary condition by demotion or promotion.

29. The test device of claim 23, wherein the target functionality and thus the requirement comprise at least one precondition and at least one postcondition.

30. The test device of claim 27, wherein a causal inconsistency between requirements in the partial plan or in the solution plan is avoided by confrontation, by avoiding the start state that was the prerequisite for the inconsistency.

31. The test device of claim 23, wherein the requirements are atomized and the requirement model is based on a composition of atomized requirements.

32. The test device of claim 23, wherein the acquisition of the requirements in formal language occurs by a controlled natural language.

33. The test device of claim 23, wherein the requirements with the smallest number of necessary actions are selected from several requirements that were determined for testing a target functionality.

34. A method for testing a control apparatus with a test device. where the control apparatus has at least one state variable and at least one actual functionality that contains a time dependency, and the control apparatus and the test device are connected to each other via a signal interface, which method comprises the following process steps:

acquisition in formal language of at least one time dependency-containing target functionality as a requirement, where the target functionality comprises at least one action and at least one expected reaction, generation of a requirement model from the requirement, generation of one or more test cases by performing at least one achievability analysis carried out in the requirement model taking into account the time dependency of the target functionality, and translation of the test cases into signal patterns, application of the signal patterns by the test device to the control apparatus via the signal interface, and acquisition of the pertinent state variables of the control apparatus with the test device; and wherein the test case is generated by the achievability analysis in the formal requirement model, by a) first establishing a start plan comprising an initial state or an initial action, and an end state or an end action, in each case by the selection of at least one state variable with defined state, b) inserting, in the start plan, a requirement from the requirement model, between the initial state or the initial action, and the end state or the end action, so that a partial plan is created, and where the resulting causal coverage is acquired, including by causal connections, and c) inserting in the partial plan successive additional requirements from the requirement model, until a causally gap-free path is achieved between the initial state- and the desired end state; and wherein a causal inconsistency between requirements in the partial plan or in the solution plan is resolved by setting at least one time boundary condition by demotion or promotion.

35. The method according to claim 34 wherein the requirements with the smallest number of necessary actions are selected from several requirements that were determined for testing a target functionality.

36. A test device for testing a control apparatus, where the control apparatus has state variables, and the test device can be connected with the control apparatus via a defined signal interface wherein the test device:

acquires a requirement in formal language at least one time dependency-containing target functionality, where the target functionality comprises at least one action and at least one expected reaction, generates a requirement model from the requirement, generates one or more test cases by performing at least one achievability analysis carried out in the requirement model taking into account the time dependency of the target functionality, and translates the test cases into signal patterns, applies the signal patterns of the test device to the control apparatus via the signal interface, and acquires the pertinent state variables of the control apparatus; and wherein a causal inconsistency between requirements in the partial plan or in the solution plan is resolved by setting at least one time boundary condition by demotion or promotion.

37. The test device of claim 36, wherein the requirements with the smallest number of necessary actions are selected from several requirements that were determined for testing a target functionality.

* * * * *